Nov. 22, 1960     H. A. SCHNEIDER     2,960,953
HAND TOOL FOR CLAMPING CABLE SEAMS
Filed Sept. 30, 1957
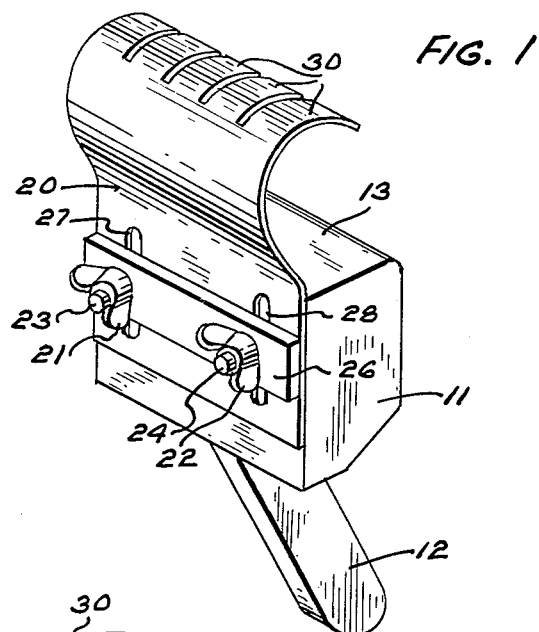
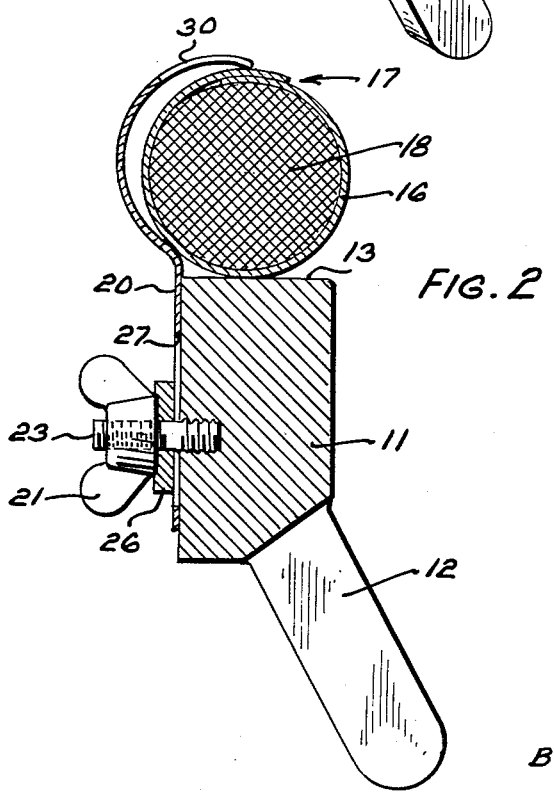
INVENTOR
H. A. SCHNEIDER
BY C. B. Hamilton
ATTORNEY

United States Patent Office 2,960,953
Patented Nov. 22, 1960

2,960,953

HAND TOOL FOR CLAMPING CABLE SEAMS

Herbert A. Schneider, Maywood, Ill., assignor to Western Electric Company, Incorporated, New York, N.Y., a corporation of New York Filed Sept. 30, 1957, Ser. No. 687,048

1 Claim. (Cl. 113—102)

This invention relates to hand tools for clamping cable seams and more particularly to hand tools for clamping overlapped seams in cable sheaths during the soldering thereof.

In prior practice, it has been difficult to hold overlapped seams in cable sheaths and to prevent opening of the seams during the soldering thereof. Slight movements of the seam during or immediately after the soldering operation result in a defective joint.

With this problem in mind, one of the objects of this invention is to provide a hand tool for holding an overlapped seam in a cable sheath during a soldering operation performed on the seam.

Another object of this invention is to provide a hand tool having a base portion and a resilient portion secured together for engaging opposite sides of a cable sheath to clamp and rigidly hold an overlapped seam therein.

With these and other objects in mind, the present invention contemplates a base member for engaging one side of a cable sheath and having a resilient member secured thereto for engaging the opposite side of the cable sheath to clamp and hold an overlapped seam in the sheath during a soldering operation performed on the seam.

Other objects and advantages of the invention will become apparent by reference to the following detailed description and the accompanying drawing illustrating a preferred embodiment of the invention, in which—

Fig. 1 is a perspective view of the hand tool embodying the principles of the invention and showing the manner in which the resilient member is secured to the base member, and Fig. 2 is an enlarged sectional view through the center of the tool illustrating the manner in which a cable seam is clamped by the hand tool.

Referring now in detail to the drawing, a block-like base member 11 having a handle 12 is provided with a surface 13 for engaging one side of a cable sheath 16, which sheath is provided with an overlapped seam 17 to be soldered. The sheath 16 encloses a cable 18 of a well-known type.

A resilient clamping member 20 constructed of spring steel is adjustably secured to the base member 11 by wing nuts 21 and 22 threaded onto screws 23 and 24 which extend through a bar 26 and elongated slots 27 and 28 in the member 20 and are threaded into the base member 11. The upper end of the member 20 is arcuate in configuration and is slotted to provide a plurality of resilient fingers 30 which engage the seam 17 to clamp and hold it.

In using this tool to clamp and hold a seam 17 to be soldered, the cable 18 and its sheath 16 are forced between the resilient fingers 30 and the surface 13 of the base member 11, as illustrated in Fig. 2. The seam 17 will thus be held closed during the soldering operation and until the solder is cooled and solidified. By loosening the wing nuts 21 and 22, the position of the clamping member 20 through the slots 27 and 28 may be adjusted on the base member 11 to accommodate cable sheaths of various sizes.

It is to be understood that the above-described arrangements are simply illustrative of the application of the principles of this invention. Numerous other arrangements may be readily devised by those skilled in the art which will embody the principles of the invention and fall within the spirit and scope thereof.

What is claimed is:

A hand tool for engaging opposite sides of the tubular sheath having an overlapped longitudinal seam to clamp and hold the overlapping seam together during a soldering operation performed on the seam, which comprises a base member having a planar surface for engaging the tubular sheath at portions thereof diametrically opposite to the seam to be soldered, a handle of rectangular cross-section depending from the base member and extending transversely of both the planar surface and a plane perpendicular to the planar surface and containing the longitudinal axis of the seam, a resilient clamping member formed of sheet spring metal, said clamping member having a slotted planar portion attached to a side of the base member and a furcated arcuate portion overlying the planar surface, the projecting ends of the furcations on said arcuate portion forming a plurality of resilient, separately deflectable, arcuately shaped fingers, the free ends of which normally terminate in a common line, spaced above the planar surface a distance less than the diameter of the sheath and designed to resiliently engage the overlapping portion of the tubular sheath in a line lying longitudinally along the midpoint of the seam and force said overlapping portion against the underlapping portion of the seam to hold the tubular sheath in place between the fingers and the planar surface of the base member, and means for adjusting the distance between the ends of the fingers and the planar surface of the base, said means having portions thereof projecting through the slots in the planar portion of the clamping member.

References Cited in the file of this patent

UNITED STATES PATENTS

| Number | Name | Date |
|---|---|---|
| 355,154 | Everett | Dec. 28, 1886 |
| 407,399 | Haines | July 23, 1889 |
| 825,332 | Mack | July 10, 1906 |
| 1,052,234 | Gaertner | Feb. 4, 1913 |
| 1,109,659 | Braden | Sept. 8, 1914 |
| 1,587,202 | Tompkins | June 1, 1926 |
| 2,105,954 | Rippe | Jan. 18, 1938 |
| 2,108,077 | Robinson | Feb. 15, 1938 |
| 2,364,150 | Lowenstein | Dec. 5, 1944 |
| 2,607,310 | Evans | Aug. 19, 1952 |